(12) United States Patent  (10) Patent No.: US 8,016,308 B2
Ishikawa et al.  (45) Date of Patent: Sep. 13, 2011

(54) REAR FENDER OF MOTORCYCLE

(75) Inventors: Yuzuru Ishikawa, Wako (JP); Gen Tanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 235 days.

(21) Appl. No.: 12/165,778

(22) Filed: Jul. 1, 2008

(65) Prior Publication Data

US 2009/0008893 A1 Jan. 8, 2009

(30) Foreign Application Priority Data

Jul. 5, 2007 (JP) ................................ 2007-177439

(51) Int. Cl.
*B62D 25/18* (2006.01)
*B62D 25/16* (2006.01)

(52) U.S. Cl. ...................... 280/152.1; 280/159; 280/160; 280/160.1; 280/847; 280/851; 280/852

(58) Field of Classification Search ............... 280/152.1, 280/851, 852, 159, 847, 160, 160.1; 362/459, 362/473, 475, 476, 497, 498, 506, 507; 40/200, 40/204

See application file for complete search history.

(56) References Cited

U.S. PATENT DOCUMENTS 4,958,451 A * 9/1990 Iwakura et al. ................ 40/204
2002/0029917 A1* 3/2002 Galbraith et al. ............ 180/219

FOREIGN PATENT DOCUMENTS

| GB | 820973 A | 9/1959 |
|---|---|---|
| JP | 2002-29475 A | 1/2002 |
| JP | 2005-329921 A | 12/2005 |
| WO | WO 2005085052 A1 * | 9/2005 |

* cited by examiner

*Primary Examiner* — J. Allen Shriver, II
*Assistant Examiner* — Bryan Evans
(74) *Attorney, Agent, or Firm* — Westerman, Hattori, Daniels & Adrian, LLP

(57) ABSTRACT

A rear fender of a motorcycle includes a hollow stay portion which extends in the vehicle rearward and downward direction from a base portion thereof arranged in the inside of a rear portion of a seat rail, the stay portion is configured to be dividable, and lines for electric components are encased in a hollow portion of the stay portion.

4 Claims, 12 Drawing Sheets

REAR FENDER OF MOTORCYCLE

TECHNICAL FIELD

The present invention relates to a rear fender of a motorcycle which extends in the vehicle rearward and downward direction from a rear portion of a seat rail and covers a rear wheel from above.

BACKGROUND OF THE INVENTION

Conventionally, on a rear portion of a motorcycle, a rear fender is mounted so as to cover a rear wheel from above. The rear fender is mounted in a state that the rear fender extends rearwardly and downwardly with respect to the vehicle from a rear portion of a seat rail. Accordingly, for enhancing the appearance of the motorcycle as viewed from a rear side, for example, various attempts including mounting of the rear fender such that a mud guard becomes inconspicuous have been made (for example, see JP-A-2002-029475). Further, on a rear surface of the rear fender, lighting parts such as a stop lamp, a rear turn signal, and a license plate light for illuminating a license plate are mounted. Lines for these lighting parts are routed to a rear side from a front side of the rear fender along an outer surface of the rear fender and, thereafter, are connected to the respective lighting parts (for example, see JP-A-2005-329921).

To enhance the appearance of the rear fender as viewed from a rear side, it is preferable to prevent the lines routed to the above-mentioned lighting parts from being viewed from the outside as much as possible. Particularly, with respect to a type of vehicle which does not mount a rear cover on a side surface of the rear fender, it is preferable to prevent the lines from being viewed also from a side surface of the rear fender.

The present invention has been made under such circumstances, and it is an object of the present invention to provide a rear fender of a motorcycle which can enhance the appearance of the motorcycle when a vehicle rear portion of a vehicle is viewed from a rear side and a lateral side of the vehicle.

SUMMARY OF THE INVENTION

A rear fender of a motorcycle according to the claimed embodiments is characterized in that the rear fender includes a hollow stay portion which extends in the vehicle rearward and downward direction from a base portion thereof arranged in the inside of a rear portion of a seat rail, the stay portion is configured to be dividable, and a line for an electric component is encased in a hollow portion of the stay portion.

Due to such a construction, it is possible to prevent a line of an electric component from being viewed from the outside of the vehicle.

Further, the electric component may be at least either one of a rear turn signal and a license plate light arranged behind the stay portion.

Due to such a construction, it is possible to prevent the line from being viewed from the outside of the vehicle even when the rear turn signal and the license plate light are arranged behind the stay portion.

Further, a turn signal mounting portion may be formed on an end portion of the stay portion, the rear turn signal may be mounted on both ends of the turn signal mounting portion, the license plate light may be arranged on an upper portion of the turn signal mounting portion, and a load hanging hook which projects in the downward direction may be mounted on both ends of the turn signal mounting portion.

Due to such a construction, it is possible to hang a load net or a fixing rope for fixing a load placed on a rear seat using the load hanging hook.

According to the present invention, the rear fender includes the hollow stay portion extending in the vehicle rearward and downward direction from the base portion thereof arranged in the inside of the rear portion of the seat rail, the stay portion is configured to be dividable, and the line for the electric component is encased in the hollow portion of the stay portion. Hence, it is possible to prevent the line of the electric component from being viewed from the outside of the vehicle, thus enhancing the appearance of the rear portion of the vehicle.

Further, the electric component is at least either one of the rear turn signal and the license plate light arranged behind the stay portion. Hence, even when the rear turn signal and the license plate light are arranged behind the stay portion, it is possible to prevent the line from being viewed from the outside of the vehicle, thus enhancing the appearance of the rear portion of the vehicle.

Further, the turn signal mounting portion is formed on the end portion of the stay portion, the rear turn signal is mounted on both ends of the turn signal mounting portion and, at the same time, the license plate light is mounted on the upper portion of the turn signal mounting portion, and the load hanging hook which projects in the downward direction is mounted on both ends of the turn signal mounting portion. Hence, it is possible to hang the load net or the fixing rope for fixing the load placed on the rear seat using the load hanging hook. Accordingly, the load can be placed on the vehicle in a stable manner thus enhancing the usefulness of the vehicle that a rider can enjoy.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
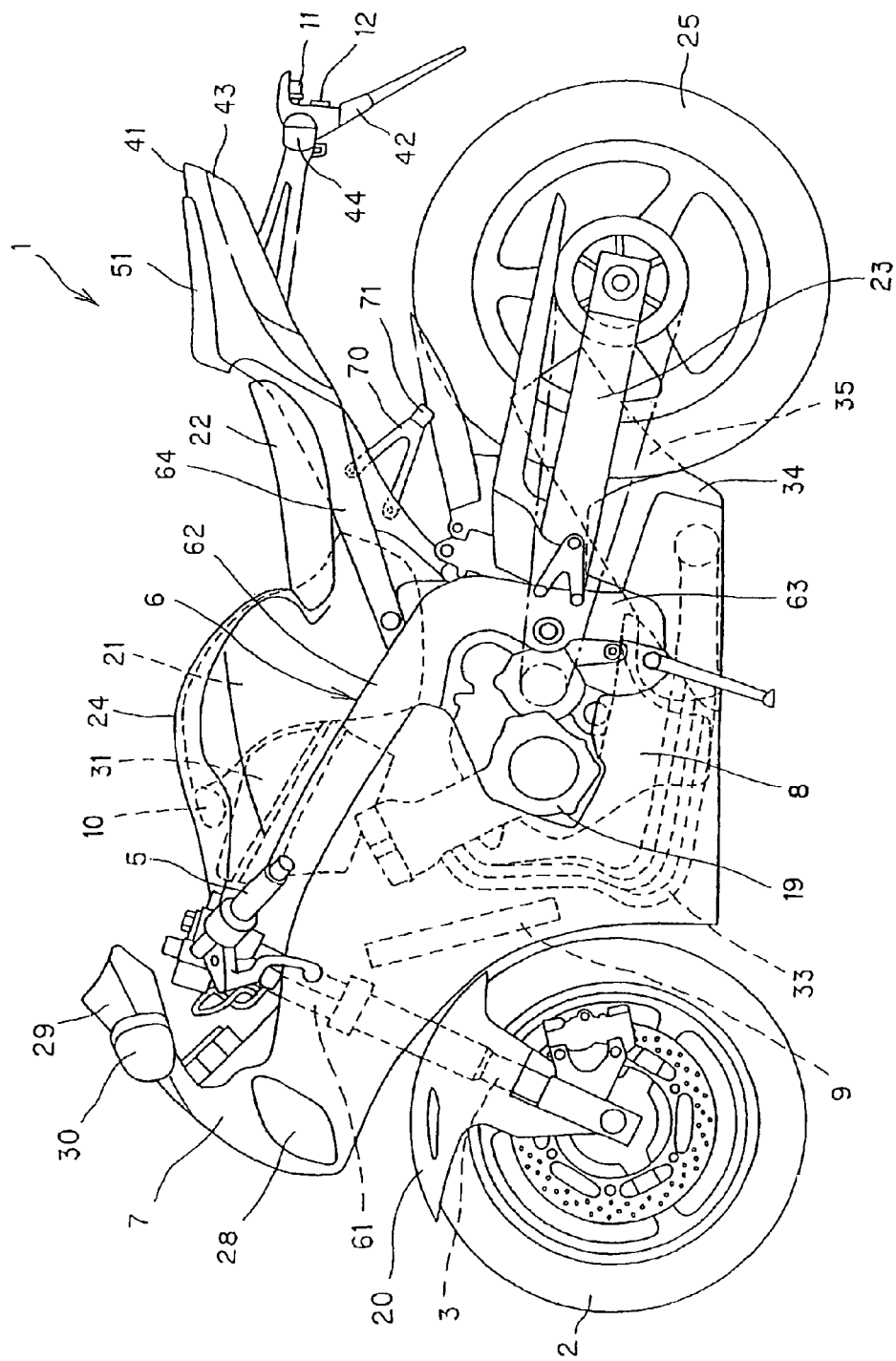
FIG. 1 is a left side view of a motorcycle according to an embodiment of the present invention.

Hereinafter, the explanation is made with respect to a rear fender of a motorcycle according to an embodiment of the present invention in conjunction with drawings. FIG. 1 is a left side view of a motorcycle 1 according to the embodiment of the present invention. Here, in the explanation made hereinafter, the upward and downward directions and the frontward and rearward directions indicate the directions with respect to the motorcycle 1 shown in FIG. 1, and the leftward and rightward directions are the directions as viewed from a rider.

As shown in FIG. 1, the motorcycle 1 includes a vehicle body frame 6. The vehicle body frame 6 is constituted of a head pipe 61, a pair of left and right main frames 62 which is bent downwardly after extending obliquely in the rearward and downward direction from the head pipe 61, a pair of left and right pivot plates 63 which is contiguously connected to rear portions of the main frames 62, and a cross member not shown in the drawing which connects the pivot plates 63 to each other in a horizontal manner. Further, a seat rail 64 extending obliquely in the rearward and upward direction is mounted on bent portions of the main frames 62 where the main frames 62 are bent in the downward direction. In the frame structure of a vehicle of this type, an engine 19, a crankcase and the like are mounted in a state that these parts are suspended from the vehicle body frame 6. That is, the so-called suspension-type structure is adopted as the frame structure thus realizing the reduction of weight of the whole vehicle body.

As shown in FIG. 1, a front fork 3 is rockably joined to the head pipe 61 of the vehicle body frame 6. A front wheel 2 including a hydraulic disc brake is rotatably supported on a lower end portion of the front fork 3, and a front fender 20 is arranged above the front wheel 2. The front fender 20 is mounted on the front fork 3 in a state that the front fender 20 is supported on the front fork 3. Further, a steering handle 5 is mounted on an upper end portion of the front fork 3.

As shown in FIG. 1, the water-cooled in-line 4-cylinder transverse engine 19, for example, is mounted on a lower side of a center portion of the vehicle body frame 6. A middle cowl 8 is mounted on both left and right sides of the engine 19. The middle cowls 8 are detachably mounted on a vehicle body contiguously with an upper cowl 7. Further, two-lamp head lights 28, 28, a wind screen 29, a pair of left and right mirrors 30, 30 are mounted on the upper cowl 7. A front turn signal is respectively incorporated in the mirrors 30, 30.

A fuel tank 21 is mounted on an upper portion of the vehicle body frame 6 above the engine 19. An air cleaner box 31 is arranged in front of the fuel tank 21. Further, an electronic control unit (ECU) 10 for controlling a throttle body and the like is arranged in front of the fuel tank 21 and on an upper portion of the air cleaner box 31. The electronic control unit 10, the fuel tank 21, and the air cleaner box 31 have whole upper portions and both sides thereof covered with a fuel tank cover 24. The air cleaner box 31 is configured to introduce traveling wind from an intake port, not shown in the drawing, formed in a front portion of the vehicle body and to feed purified air to the throttle body, not shown in the drawing. Further, fuel in the fuel tank 21 is sucked by a fuel supply pump, not shown in the drawing, which is arranged in the inside of the fuel tank 21 and, then, the fuel is supplied to the throttle body. Accordingly, an air-fuel mixture which is produced by mixing air and fuel in the throttle body is supplied to the engine 19.

A radiator 9 which is connected to the engine 19 by way of a pipe, not shown in the drawing, is provided for supplying cooling water and is arranged in front of the engine 19. Further, four exhaust pipes 33 are connected to the engine 19 and extend from a front side of the engine 19. These exhaust pipes 33 extend downwardly from the engine 19 and, thereafter, extend toward a rear portion of the vehicle along a bottom portion of the vehicle body, and are connected to a chamber 34 arranged on a right side of the vehicle body. A muffler 35 connected to the chamber 34 projects in an oblique rearward and upward direction. The muffler 35 has a rear end portion thereof arranged at a front oblique upper position with respect to a rear wheel shaft. Although the muffler has a relatively small length, for sufficiently ensuring an exhaust passage and a space in the inside of the muffler 35, the muffler 35 has a large diameter.

Here, the middle cowl 8 on the right side and the middle cowl 8 on the left side have different shapes. To be more specific, the left middle cowl 8 covers a side surface of a portion of the exhaust pipe 33 extending from the engine to a portion where the exhaust pipes 33 are connected to the chamber 34. On the other hand, the right middle cowl 8 is formed to cover a side surface of a portion of the vehicle body up to the muffler 35, to avoid covering the muffler 35.

Further, a swing arm 23 (rear fork) is rockably supported on a rear lower portion of the vehicle body frame 6, and a chain-driven-type rear wheel 25 including a hydraulic disc brake is rotatably supported on a rear end portion of the swing arm 23 below the rear fender 42.

On the other hand, a front seat 22 and a rear seat (pillion seat) 51 are respectively mounted on an upper portion of the seat rail 64. A rear cowl 41 and the rear fender 42 are arranged in the vicinity of the rear seat 51. A pair of left and right rear turn signal 44 is mounted on the rear fender 42.

Although the rear cowl 41 covers a rear portion of the seat rail 64, the rear cowl 41 does not cover a center portion and a front portion of the seat rail 64. That is, the rear cowl 41 has a small area for covering side surfaces of the vehicle body, and the whole profile of the rear cowl 41 is miniaturized compared to a conventional rear cowl. A stop lamp 43 is mounted on the rear cowl 41.

Figure 2:
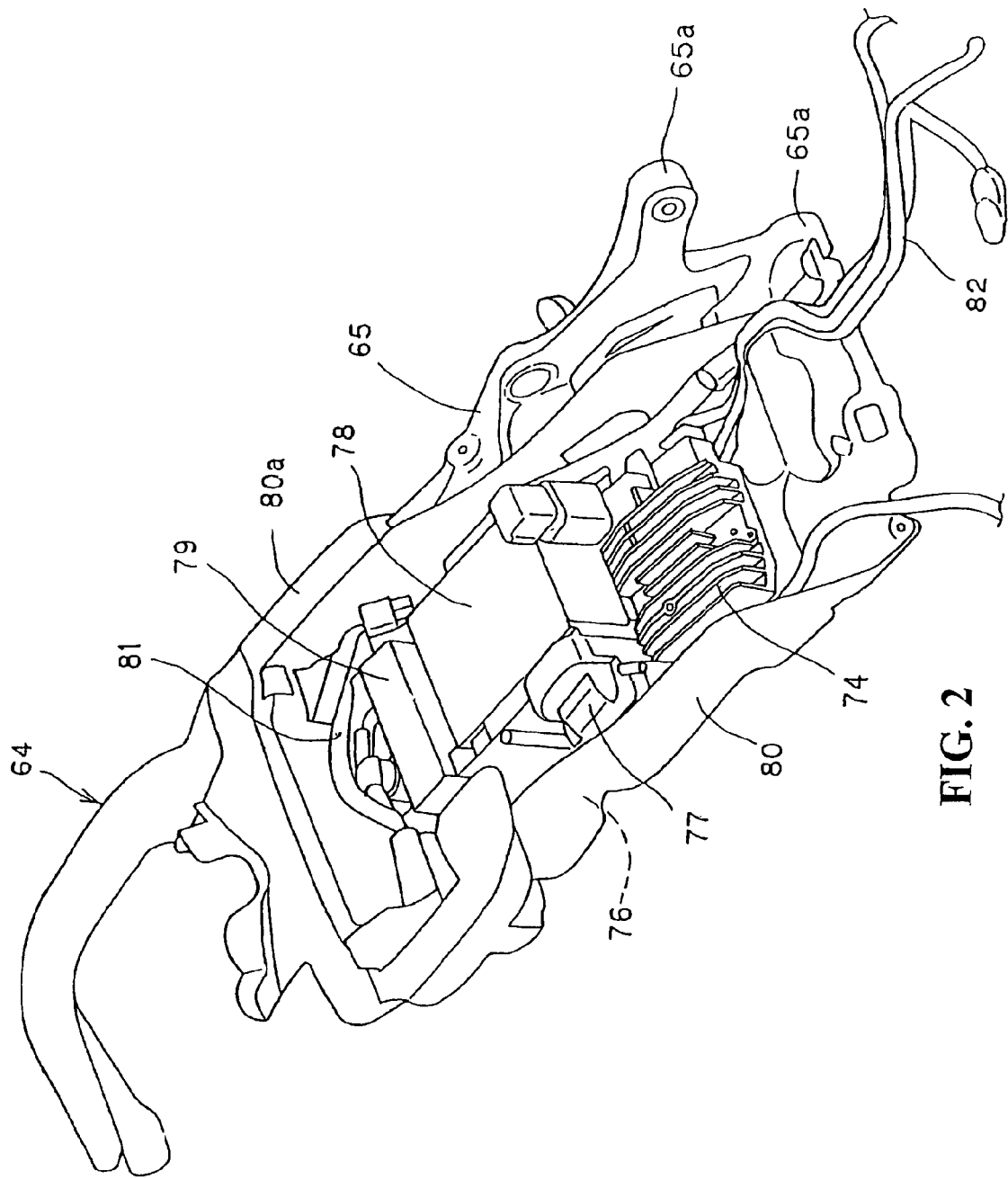
FIG. 2 is a perspective view showing a state that a cover is mounted on a front portion of a seat rail as viewed from a right oblique anterior angle of a vehicle.
Figure 3:
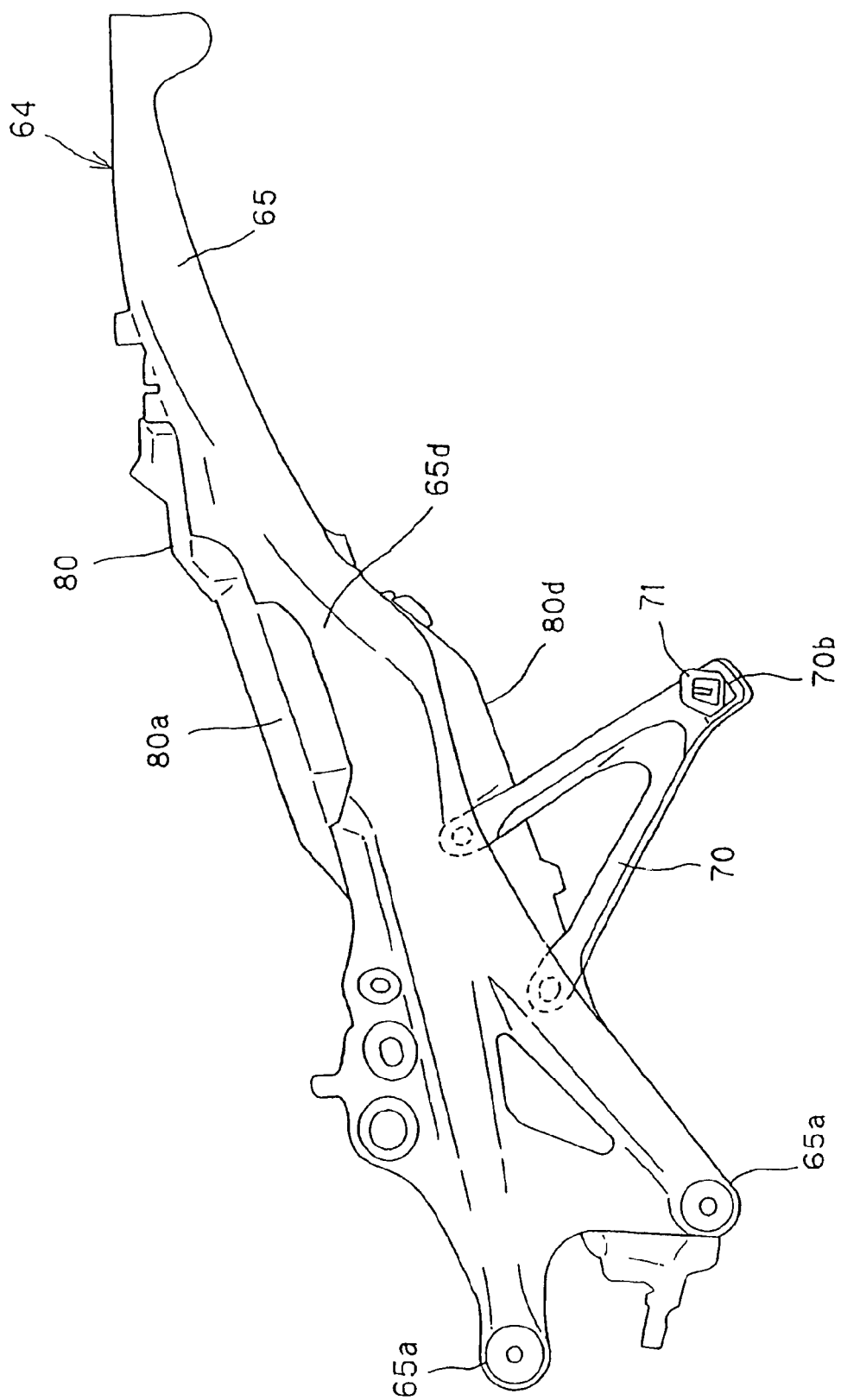
FIG. 3 is a side view of the state shown in FIG. 2.

FIG. 2 is a perspective view showing a state that a cover 80 is mounted on a front portion of the seat rail 64 as viewed from a right oblique anterior angle of the vehicle. Further, FIG. 3 is a view showing a state that the cover 80 is mounted on the seat rail 64 shown in FIG. 2 as viewed from a side. Here, in FIG. 3, a left side of the drawing indicates the front side of the vehicle.

The seat rail 64 is constituted of side wall portions 65, 65 (in FIG. 2, right side wall portion being omitted) constituting left and right side portions, and a joint portion 66 (detail of the joint portions being described later in conjunction with FIG. 9) joining the respective side wall portions 65, 65 in the lateral widthwise direction. A front end portion of the side wall portion 65 is vertically bifurcated and two mounting portions 65a, 65a to be mounted on the main frame 62 are arranged on distal end portions of the bifurcated portions in a vertically spaced-apart manner.

A shown in FIG. 3, the side wall portion 65 has a thickness in the vertical direction which gradually decreases rearwardly from a front end portion thereof, and an outer surface 65d of the side wall portion 65 is gently curved and hence, the side wall portion 65 is formed with a good appearance. Due to such a constitution, even when the outer surface 65d of the side wall portion 65 is viewed from the outside of the motorcycle 1 in a state that the seat rail 64 is assembled in the vehicle body, there is no possibility that the appearance of the motorcycle 1 is damaged. The good appearance of the motorcycle 1 can be suitably designed corresponding to various types of vehicles. Further, on a front-side portion of the side wall portion 65 slightly close to the front center of the side wall portion 65, as shown in FIG. 1 and FIG. 3, a step holder 70 projecting downwardly from the side wall portion 65 is mounted, and a step 71 for allowing a rider to place his/her foot thereon is mounted on a step mounting portion 70b formed on a lower end portion of the step holder 70.

As shown in FIG. 2, the cover 80 is arranged in an inner space defined by the left and right side wall portions 65 at a front portion of the seat rail 64. The cover 80 has a box shape with an open upper surface and an open front surface. When the front seat 22 is removed, these openings of the cover 80 face the outside. In the inside of the cover 80, a fuse box 79, a regulator 74, an exhaust-valve-use servomotor 76, a starter-use magnet 77, a battery 78 and the like are housed. Electric-system lines such as lines 81 for the electric components (the stop lamp 43, the license plate light 11, and the rear turn signal 44) positioned at the rear portion of the rear fender 42 and lines 82 for the servomotor 76 can be relayed in the inside of the cover 80.

Further, as shown in FIG. 2 and FIG. 3, on both left and right sides of an upper rear portion of the cover 80, mounting portions 80a, 80a extending outwardly in the vehicle-width direction in a flange shape are respectively mounted. When the cover 80 is mounted on the seat rail 64 from above, the mounting portions 80a are placed on upper surfaces of the left and right side wall portions 65, thus ensuring the positioning of the cover 80 in the vertical direction. Further, the cover 80 is mounted on a joint member, not shown in the drawing, which connects the left and right side wall portions 65 in the widthwise direction using mounting bolts or the like.

Figure 4:
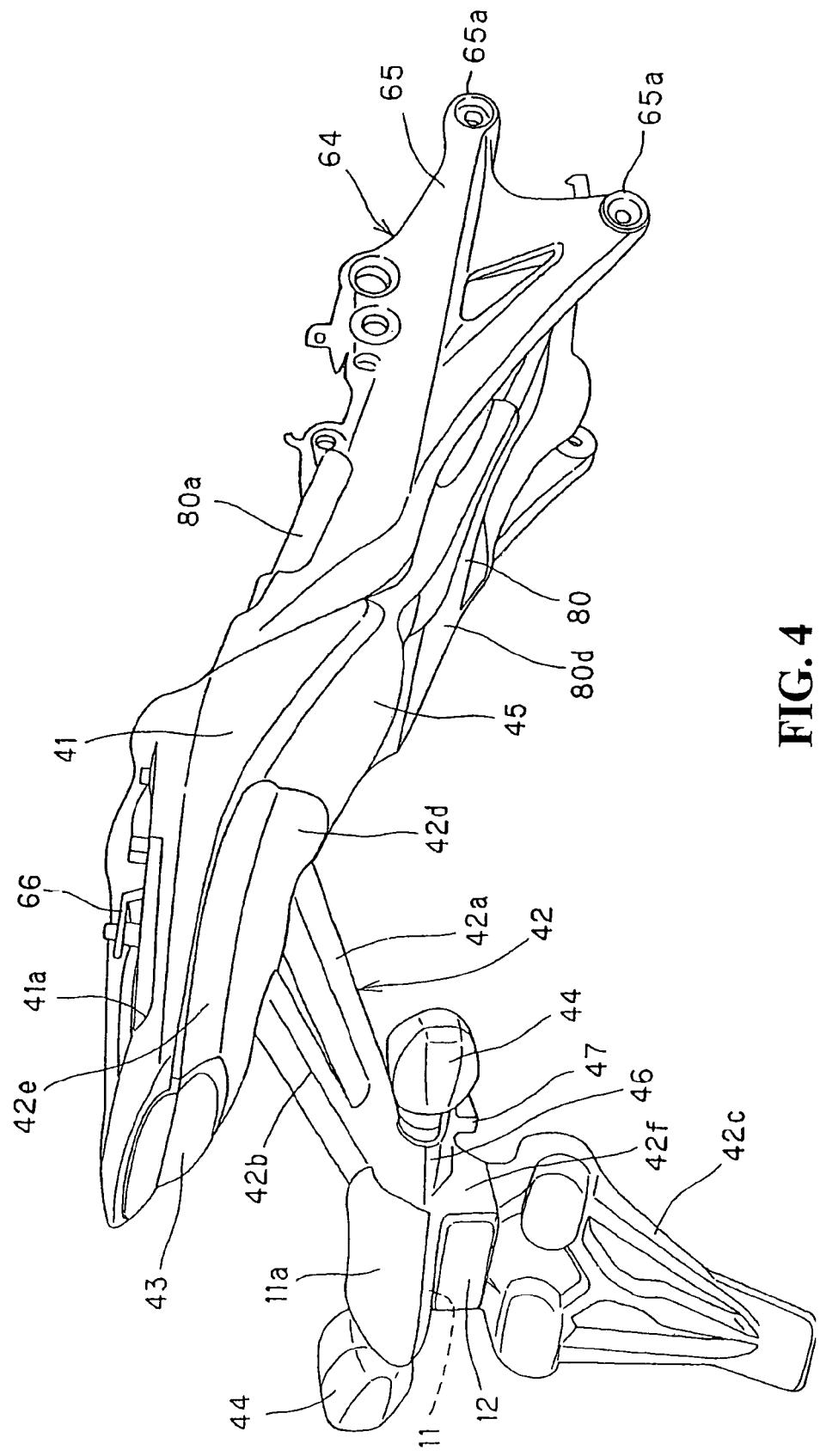
FIG. 4 is a perspective view of a portion of a rear fender shown in FIG. 1 as viewed from a right oblique posterior angle of the vehicle.
Figure 5:
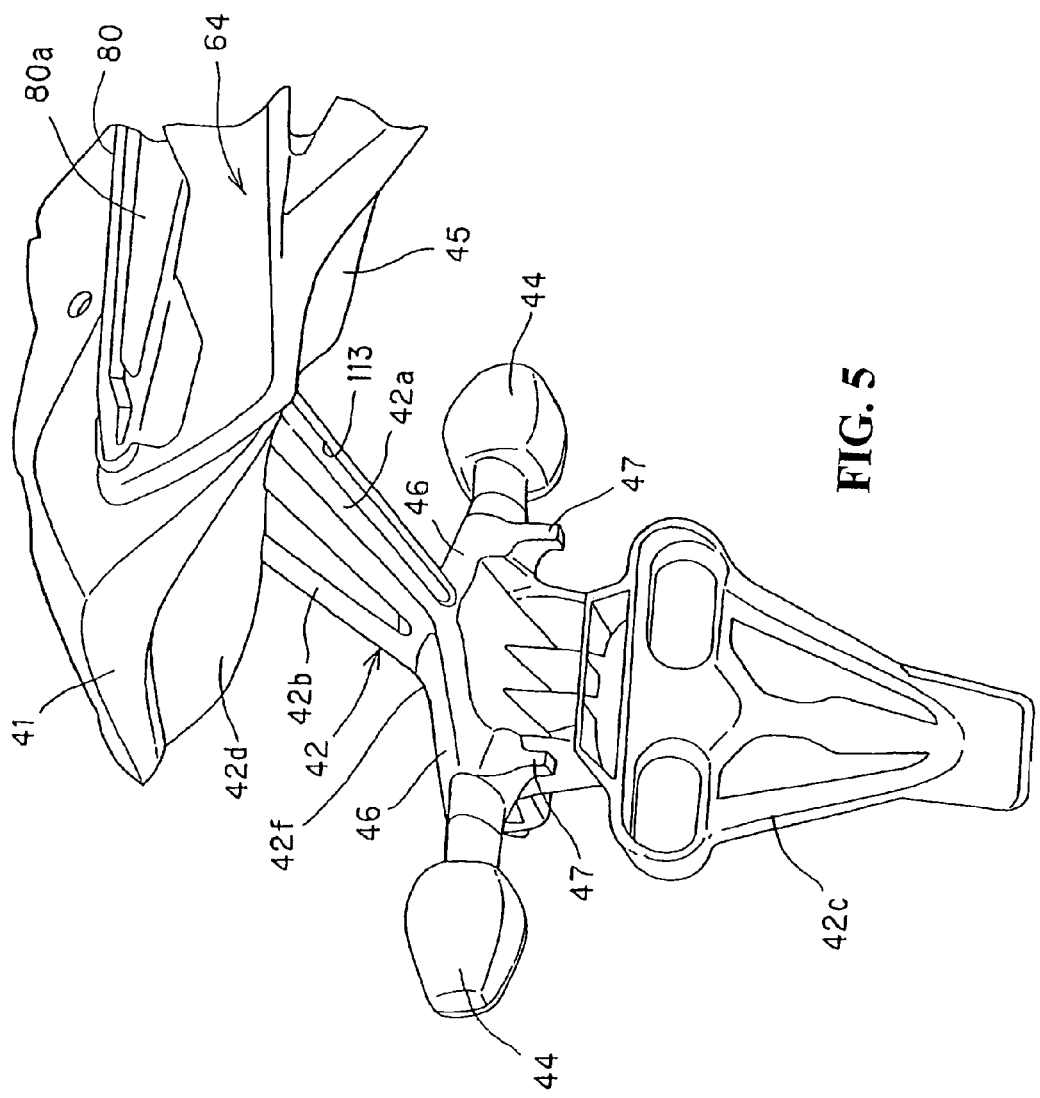
FIG. 5 is a perspective view of the portion of the rear fender shown in FIG. 4 as viewed from a right oblique anterior angle of the vehicle.
Figure 6:
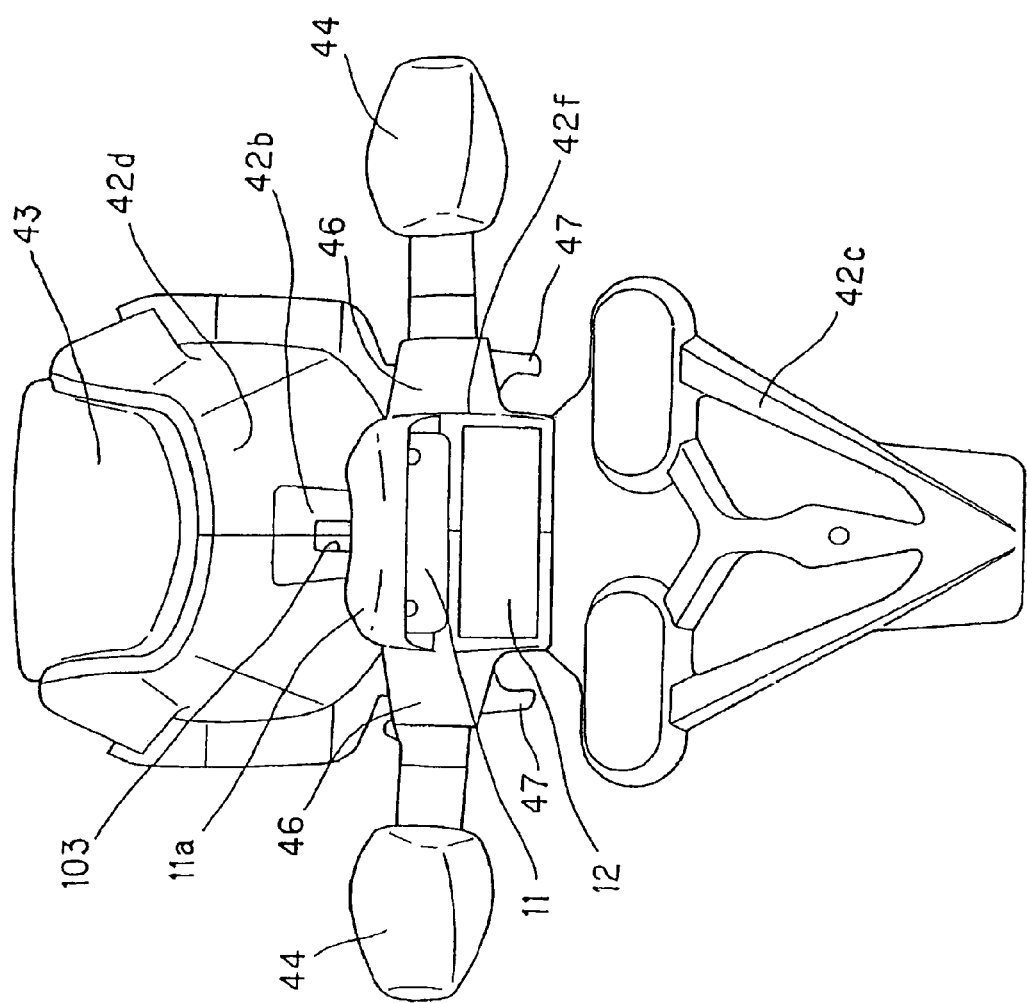
FIG. 6 is a rear view of the portion of the rear fender shown in FIG. 4 as viewed from a posterior angle of the vehicle.
Figure 7:
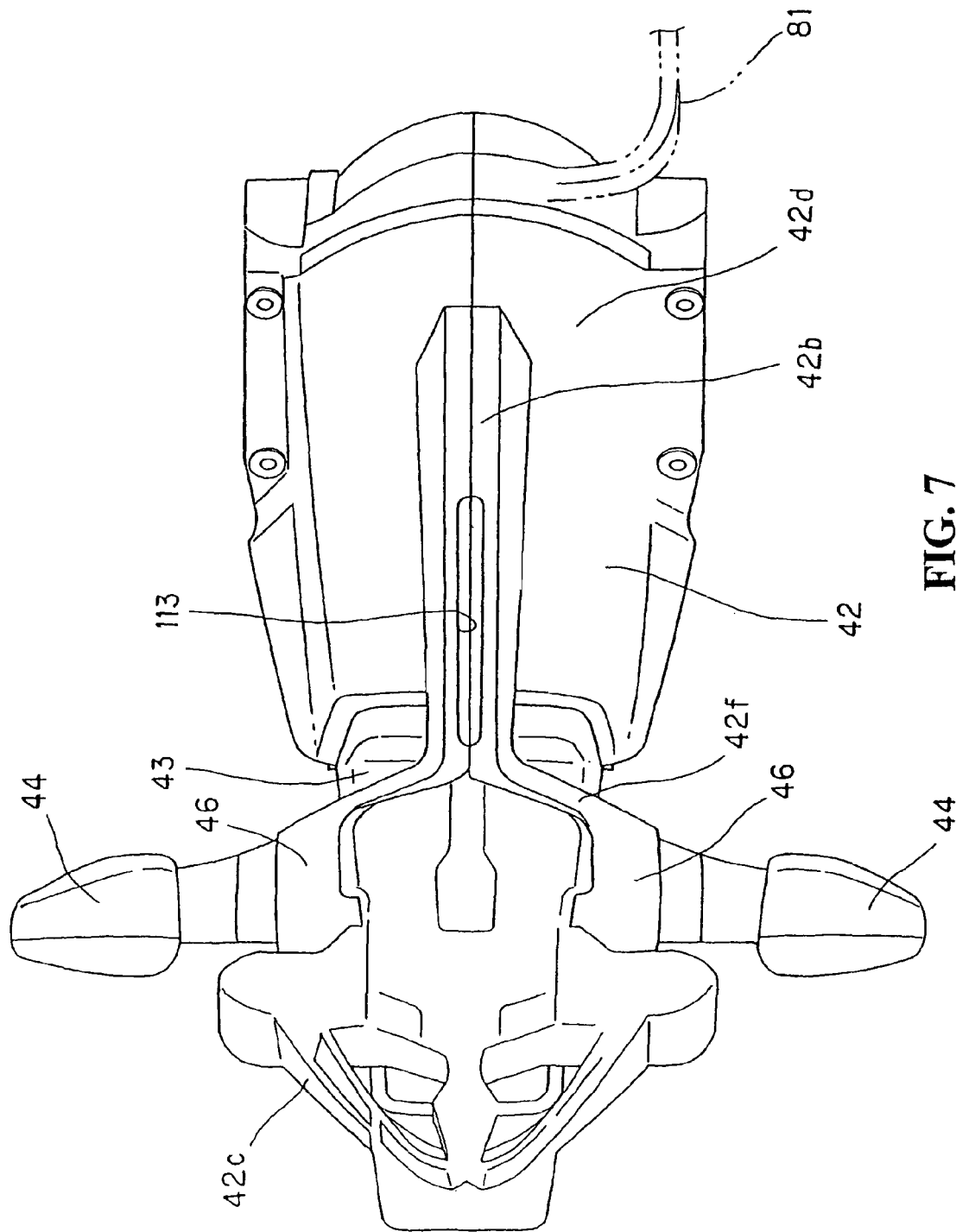
FIG. 7 is a bottom view of the portion of the rear fender shown in FIG. 4 as viewed from below the vehicle.

FIG. 4 is a perspective view of a portion of the rear fender shown in FIG. 1 as viewed from a right oblique posterior angle of the vehicle. Here, in FIG. 4, portions arranged in front of the seat rail 64, that is, the front seat 22 and the rear seat 51 are omitted. Further, FIG. 5 is a perspective view of the portion of the rear fender shown in FIG. 4 as viewed from a right oblique anterior angle of the vehicle. Further, FIG. 6 is a rear view of the portion of the rear fender shown in FIG. 4 as viewed from a rear side of the vehicle, and FIG. 7 is a bottom view of the portion of the rear fender shown in FIG. 4 as viewed from below the vehicle.

As shown in FIG. 4, on a rear portion of the seat rail 64, the rear fender 42 is mounted. The rear fender 42 is constituted of an upper cover portion 42e extending in the longitudinal direction, a lower stay portion 42a and an upper stay portion 42b extending in the lower oblique rearward direction of the vehicle from a bottom surface of the upper cover portion 42e, turn signal mounting portions 42f arranged below the lower stay portion 42a and the upper stay portion 42b, and license-use brackets 42c mounted on lower portions of the turn signal mounting portions 42f. Although described in detail later, the lines 81 connected with the stop lamp 43 and the like extend in the inside of the rear fender 42.

The upper cover portion 42e is mounted to cover a lower portion of the rear portion of the seat rail 64. Further, the stop lamp 43 is mounted on a rear end portion of the upper cover portion 42e.

An upper end portion (base portion) of the lower stay portion 42a is arranged in front of an upper end portion of the upper stay portion 42b, and the lower stay portion 42a and the upper stay portion 42b are respectively connected to a bottom portion 42d of the upper cover portion 42e. Further, the lower stay portion 42a and the upper stay portion 42b are arranged at the substantially center of the vehicle in the lateral direction, and the respective upper end portions of the lower stay portion 42a and the upper stay portion 42b are arranged in the inside of the rear portion of the seat rail 64. On the other hand, a lower end portion of the lower stay portion 42a and a lower end portion of the upper stay portion 42b are merged together and the merged lower end portion is connected to the turn signal mounting portion 42f.

On the blinker mounting portion 42f, projecting portions 46, 46 which respectively project leftwardly and rightwardly from both side portions of the turn signal mounting portion 42f are mounted. Two rear turn signals 44 are respectively mounted on distal end portions of the left and right projecting portions 46, 46. Further, on the respective projecting portions 46, load hanging hooks 47, 47 projecting in the vehicle downward direction are integrally formed.

On the blinker mounting portion 42f, the license plate light 11 which radiates light downwardly toward a license plate (not shown in the drawing) and is mounted on the license-use bracket 42c is mounted. Further, a license-light-use cover 11a which forms an opening in a lower portion thereof is mounted to cover the license light 11. Further, below the license plate light 11 and above the license-use bracket 42c, a rectangular reflector 12 is arranged.

By extending the upper stay portion 42b and the lower stay portion 42a in the direction toward the rear lower portion of the vehicle and by arranging the rear turn signals 44 and the license plate light 11 behind the upper stay portion 42b and the lower stay portion 42a, the rear portion of the vehicle can acquire a compact and slim appearance. Especially, even when the rear portion of the vehicle is not covered with the rear cowl 41, the vehicle possesses such slim a structure and hence, there is no possibility that the appearance of the vehicle is damaged.

On an upper portion of the rear fender 42, the rear cowl 41 (omitted in FIG. 6) which constitutes an exterior part is mounted in a state that the rear cowl 41 covers an upper portion and a side portion of the seat rail 64. An opening 41a is formed in an upper surface of the rear cowl 41. A joint portion 66 where the left and right side wall portions 65 of the seat rail 64 are joined to each other is exposed through the opening 41a, and the rear seat 51 (see FIG. 1) is mounted on the joint portion 66 and the side wall portions 65.

Further, the under cover 45 is arranged between the bottom portion 42d of the upper cover portion 42e of the rear fender 42 and the bottom portion 80d of the cover 80. The under cover 45 covers the lines 81 extending to the rear fender 42 from the cover 80 from below, thus preventing the lines 81 from being viewed from the outside of the vehicle. Further, the under cover 45 also plays a role of an exterior part which connects the bottom portion 42d of the rear fender 42 and the bottom portion 80d of the cover 80 with good appearance using a curved surface.

The seat rail 64, the rear cowl 41, the rear fender 42, the cover 80 and the under cover 45 are exposed in a visible manner as viewed from the rear portion or the side portion of the motorcycle 1. Due to the provision of these parts, it is possible to enhance the appearance of the motorcycle 1.

Figure 8:
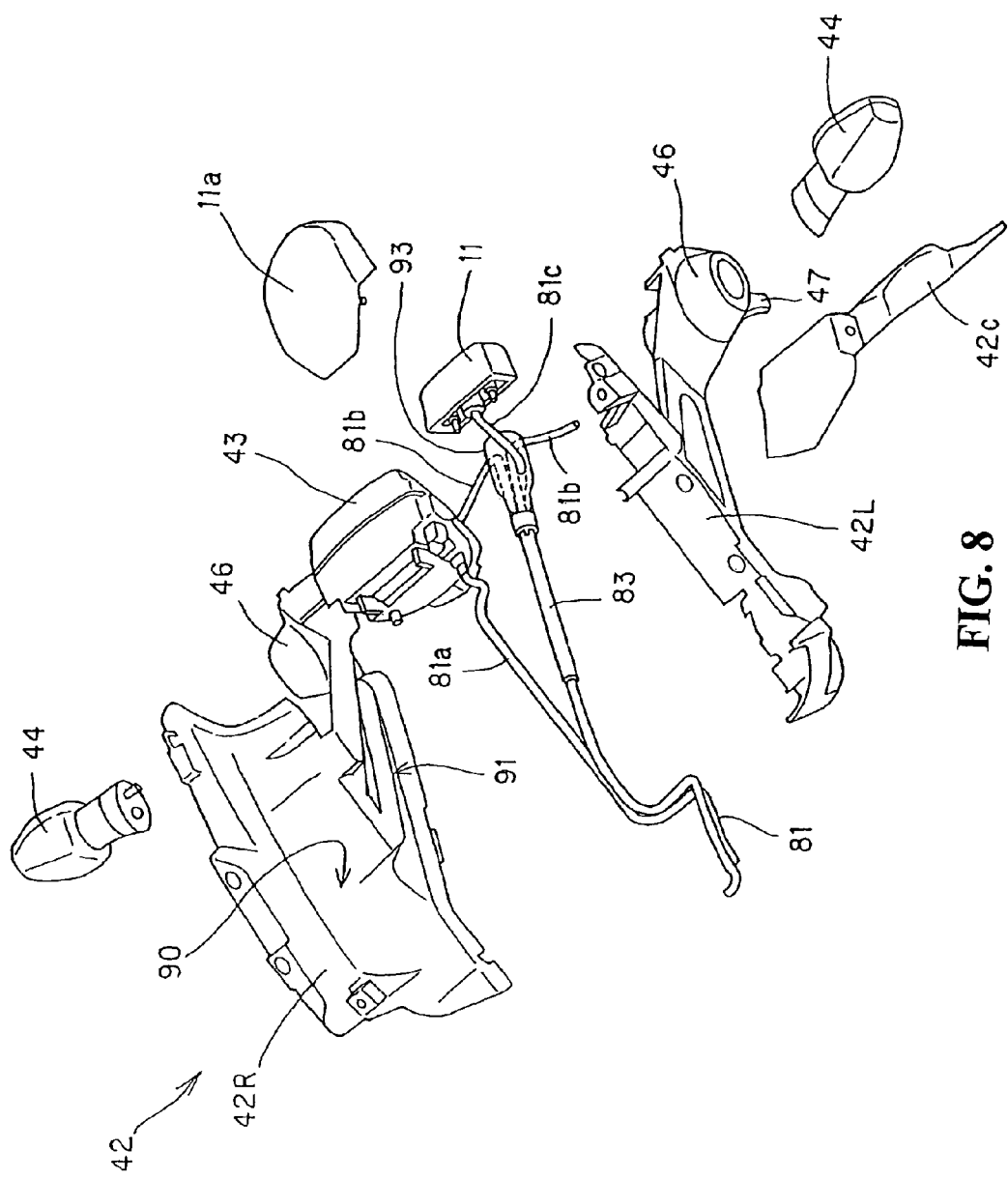
FIG. 8 is an exploded perspective view of the rear fender.

FIG. 8 is an exploded perspective view of the rear fender 42. Further, FIG. 9 is a perspective view with a part broken away as viewed from a right oblique anterior angle of the vehicle showing a state that the respective parts shown in FIG. 8 are assembled. Further, FIG. 10 is a cross-sectional view of the respective parts shown in FIG. 9 as viewed from a side.

As shown in FIG. 8, the rear fender 42 has the two-split structure consisting of a left fender portion 42L and a right fender portion 42R, wherein a plane which vertically extends while passing through the center of the lateral direction of the vehicle constitutes a split face. The left fender portion 42L and the right fender portion 42R are integrally formed with each other using a resin material, and these fender portions are engaged with each other by overlapping engaging portions (not shown in the drawing) thereof formed on the split face. Hence, these fender portions can be assembled without using fastening members such as bolts. The engaging portion between the left and right fender portions may be constituted such that engaging pawls projecting toward the right fender portion 42R from the left fender portion 42L and engaging holes formed at positions of the right fender portion 42R corresponding to the engaging pawls are engaged with each other and the engagement is maintained due to the resiliency of the engaging pawls.

The left fender portion 42L and the right fender portion 42R are respectively formed such that the inside of the rear fender 42 becomes hollow when these fender portions 42L, 42R are assembled to each other. To be more specific, a stop-lamp wiring hollow portion 90 is formed in the inside of the upper cover portion 42e. A rear-turn signal/license-plate-light wiring hollow portion 91 is formed in the inside of the lower stay portion 42a, and a branching-use hollow portion 92 is formed in the inside of the blinker mounting portion 42f.

Figure 9:
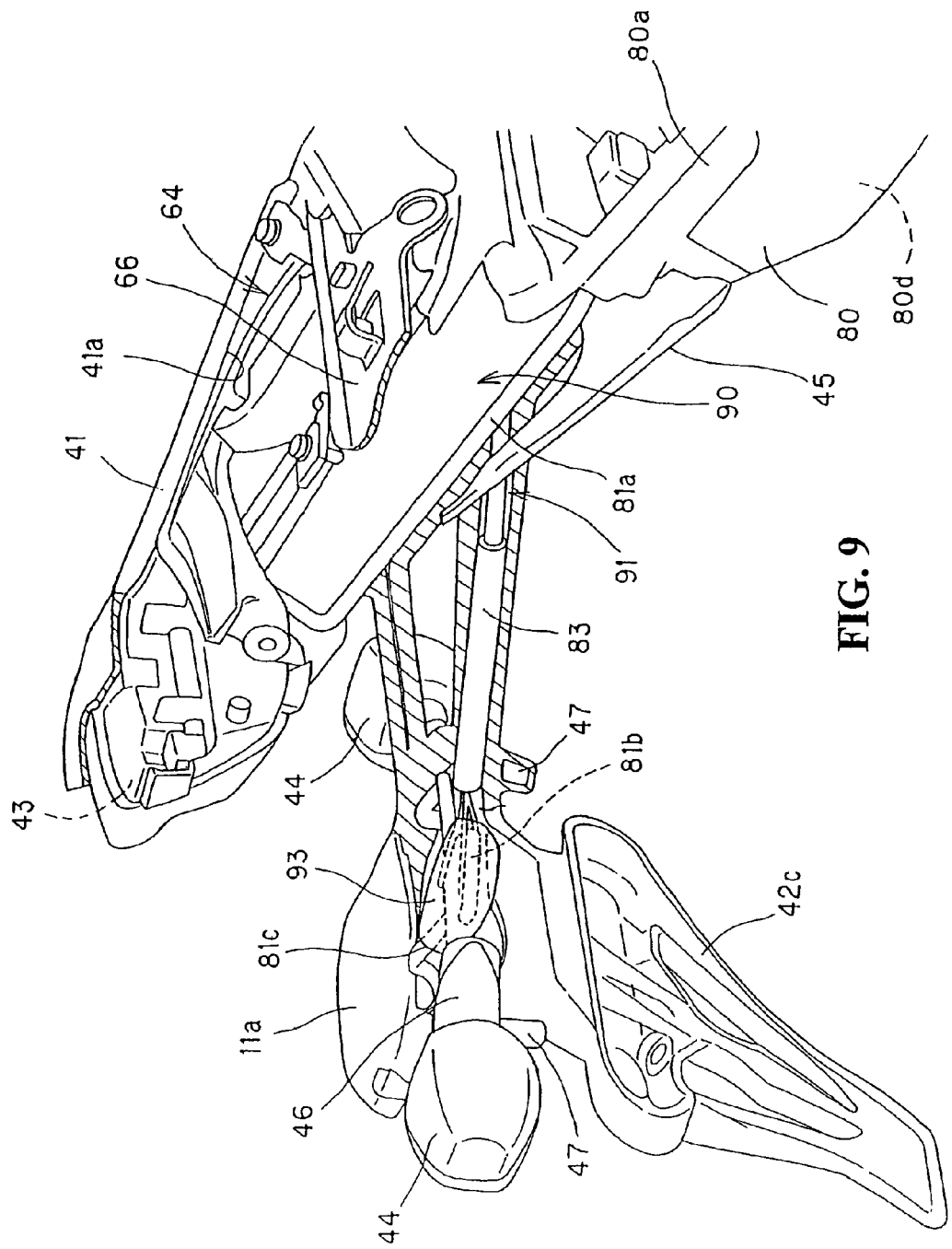
FIG. 9 is a perspective view showing a state of a portion of the rear fender is cut off as viewed from a right oblique anterior angle.
Figure 10:
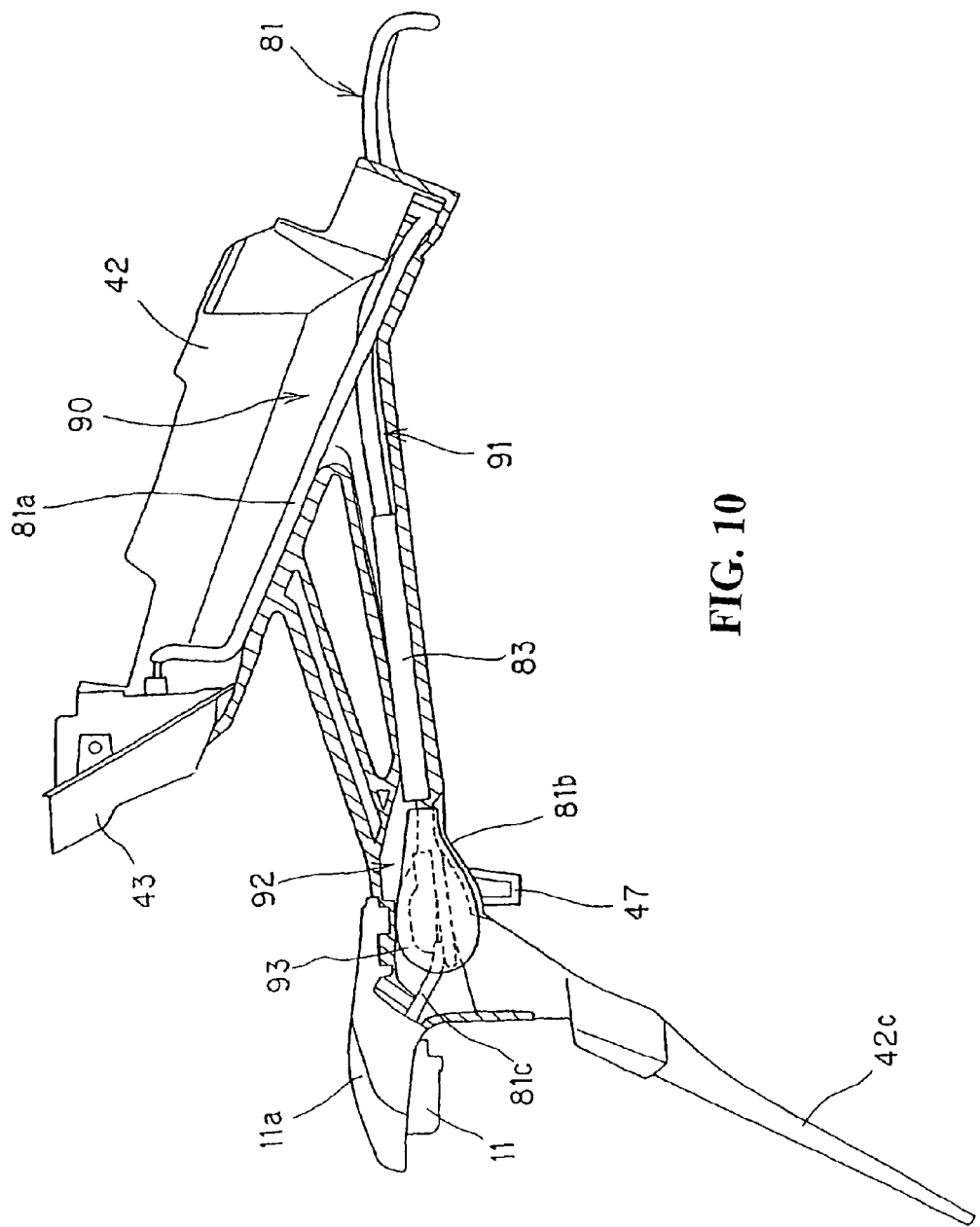
FIG. 10 is a side view showing the state that the portion of the rear fender is cutoff as viewed from a right side.

As shown in FIG. 9 and FIG. 10, the stop-lamp wiring hollow portion 90 is formed such that the hollow portion 90 continuously extends to the stop lamp 43 arranged at the rear end portion of the upper cover portion 42e from the cover 80. In the inside of the hollow portion 90, a stop-lamp-use line 81a extending from the cover 80 is routed in the longitudinal direction of the vehicle. The routed stop-lamp-use line 81 a is connected to the stop lamp 43.

As shown in FIG. 9 and FIG. 10, the rear turn signal/license plate light wiring hollow portion 91 is formed such that the hollow portion 91 continuously extends to the branching-use hollow portion 92 from the stop-lamp wiring hollow portion 90. In the inside of the hollow portion 91, two rear-turn signal-use lines 81b, 81b extending from the cover 80 and a license-plate-light-use line 81c are routed in the longitudinal direction of the lower stay portion 42a. The rear-turn signal-use lines 81b, 81b and the license-plate-light-use line 81c are collectively covered with a damping member 83 (for example, a sponge or a damping rubber) in the inside of the rear-turn signal/license plate light wiring hollow portion 91, thus preventing the lines 81b, 81c from being in contact with an inner wall of the hollow portion 91. Further, as shown in FIG. 9 and FIG. 10, the damping member 83 is arranged to be in contact with an inner wall of the hollow portion 91 with no gap.

In the inside of the branching-use hollow portion 92, the rear-turn signal-use lines 81b, 81b and the license-plate-light-use line 81c which are branched from the line 81 at a final end of the damping member 83 are respectively routed to two rear turn signals 44 and the license plate light 11. As shown in FIG. 8, at a portion where the lines 81b, 81c are branched, a protection cover 93 for protecting the lines 81b, 81c is arranged. These lines 81b, 81c are respectively made to pass through branching holes formed in the protection cover 93 and are branched toward the rear turn signals 44 and the license plate light 11. The respective routed rear-turn signal-use lines 81b, 81b are connected to the rear turn signals 44, and the routed license-plate-light-use line 81c is connected to the license plate light 11.

Figure 11A:
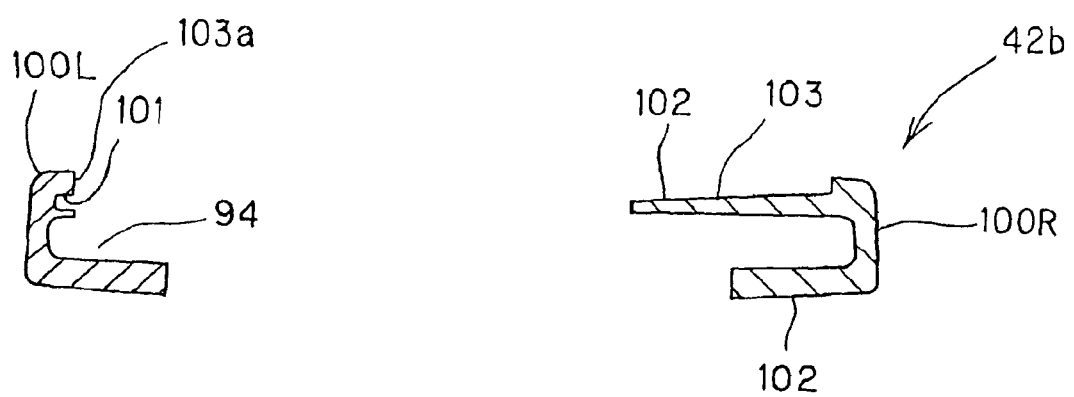
FIG. 11(*a*) is a cross-sectional view of an upper stay portion, and FIG. 11(*b*) is a cross-sectional view of a lower stay portion.
Figure 11B:

FIG. 11(a) is a cross-sectional view of the upper stay portion 42b taken along a plane orthogonal to the longitudinal direction of the upper stay portion 42b, wherein the left fender portion 42L and the right fender portion 42R are disassembled in the lateral direction. Further, FIG. 11(b) is an exploded cross-sectional view showing the lower stay portion 42a in the same manner as the upper stay portion 42b shown in FIG. 11(a).

The lower stay portion 42a and the upper stay portion 42b have different shapes between a left side portion 100L and a right side portion 100R. When the left side portion 100L and the right side portion 100R are assembled to each other, the hollow portions 91, 94 which are surrounded by an upper wall portion and a lower wall portion are formed in the inside of the lower stay portion 42a and the upper stay portion 42b.

As shown in FIG. 11(a), in the upper stay portion 42b, a lower wall portion of the left side portion 100L and a lower wall portion of the right side portion 100R are formed in left and right symmetry, and when the left side portion 100L and the right side portion 100R are assembled to each other, the lower wall portions are assembled to each other with the split face arranged substantially at the center of the upper stay portion 42b.

On the other hand, with respect to upper wall portion, a projecting wall 102 formed on the right side portion 100R is configured to be inserted in a recessed portion 101 formed in the left side portion 100L. Further, the projecting portion 102 is arranged inside from an uppermost surface of the upper wall portion by one step and hence, in a state that the left side portion 100L and the right side portion 100R are assembled to each other, a groove 103 extending in the extending direction of the upper stay portion 42b is formed on an upper surface of the upper wall surface (see FIG. 6). Due to such a constitution, the split face between the left side portion 100L and the right side portion 100R agrees with an inner wall surface 103a of the groove 103 in the inside of the groove 103. Hence, the split face becomes inconspicuous compared to a case in which the split face is arranged at the center of the groove 103.

As shown in FIG. 11(b), in the lower stay portion 42a, an upper wall portion of the left side portion 110L and an upper wall portion of the right side portion 110R are arranged in left and right symmetry, and when the left side portion 110L and the right side portion 110R are assembled to each other, a split face between the left side portion 110L and the right side portion 110R is arranged substantially at the center of the lower stay portion 42a.

On the other hand, with respect to lower wall portions, the left side portion 110L and the right side portion 110R are configured to be assembled in a state that an upper surface of the projecting wall 112 formed on the right side portion 110R is brought into contact with a lower surface of a stepped portion 111 formed in the left side portion 110L. Further, the projecting wail 112 is arranged inside from an uppermost surface of the upper wall portion by one step and hence, in a state that the left side portion 110L and the right side portion 110R are assembled to each other, a groove 113 extending in the extending direction of the lower stay portion 42a is formed on a lower surface of the lower wall surface (see FIG. 5 and FIG. 7). Further, a distal end portion of the projecting wall 112 extends and reaches an inner wall surface 113a of the groove 113 in a state that the left side portion 110L and the right side portion 110R are assembled to each other. Due to such constitution, a split face between the left side portion 110L and the right side portion 110R agrees with the inner wall surface 113a of the groove 113. Hence, the split face becomes inconspicuous compared to a case in which the split face is arranged at the center of the groove 113.

According to the rear fender of the motorcycle according to the embodiment of the present invention, the stop-lamp-use line 81a, the rear-turn signal-use line 81b, and the license-plate-light-use line 81c are arranged in a state that these lines pass through the inside of the rear fender 42. Hence, there is no possibility that these lines 81a, 81b, and 81c are viewed from the outside of the vehicle with naked eyes, whereby it is possible to enhance the appearance of the rear portion of the vehicle.

Further, the lower stay portion 42a which extends toward the rear lower portion of the vehicle from the base portion arranged inside the rear portion of the seat rail 64 is provided, the rear-turn signal/license plate light wiring hollow portion 91 is formed in the lower stay portion 42a and, at the same time, the lower stay portion 42a is formed in a two-split manner in the lateral direction, and the lines 81b, 81c of the rear turn signals 44 and the license plate light 11 are encased in the rear-turn signal/license plate light wiring hollow portion 91. Hence, it is possible to prevent the lines 81b, 81c from being viewed from the outside of the vehicle. Due to such constitution, it is possible to enhance the appearance of the vehicle as viewed from the outside of the vehicle.

Further, the groove 103 is formed in the upper wall portion of the upper stay portion 42b, and the split face of the upper stay portion 42b is made to agree with the inner wall surface 103a of the groove 103. Hence, it is possible to make the split face inconspicuous. Due to such constitution, it is possible to enhance the appearance when the upper wall portion of the upper stay portion 42a is viewed from a rear upper portion of the vehicle.

In the same manner as the upper stay portion 42b, the groove 113 is formed in the lower wall portion of the lower stay portion 42a, and the split face of the lower stay portion 42a is made to agree with the inner wall surface 113a of the groove 113. Hence, it is possible to make the split face inconspicuous. Due to such construction, it is possible to enhance the appearance when the lower wall portion of the lower stay portion 42a is viewed from the rear lower portion of the vehicle.

Further, by allowing the upper stay portion 42b and the lower stay portion 42a to extend in the direction toward the rear lower portion of the vehicle, and by arranging the rear turn signals 44 and the license plate light 11 behind the respective stay portions, the rear portion of the vehicle can acquire a slim and compact appearance. Accordingly, even when the rear portion of the vehicle is not covered with the rear cowl 41, due to the slim structure, there is no possibility that the appearance of the vehicle is damaged.

Further, the projecting portions 46, 46 projecting leftwardly and rightwardly are formed on the turn signal mounting portion 42f of the rear fender 42, the rear turn signals 44, 44 are mounted on distal ends of the projecting portions 46, 46. Further, the load hanging hooks 47, 47 projecting in the direction toward the lower portion of the vehicle are integrally formed on the projecting portions 46, 46. Accordingly, it is possible to hang a load net or a fixing rope for fixing the load placed on the rear seat 51 using the load hanging hooks 47, 47. In this manner, it is possible to enhance the usefulness of the vehicle that a rider can enjoy.

Although the explanation has been made with respect to the embodiment of the present invention heretofore, various modifications and variations are conceivable based on the technical concept of the present invention.

For example, in this embodiment, although both of the rear turn signals 44 and the license plate light 11 are arranged behind the lower stay portion 42a and the upper stay portion 42b, either one of these parts may be arranged behind the lower stay portion 42a. Further, the stop lamp 43 may be arranged behind the stay portions and the line of the stop lamp 43 may be made to pass the inside of the lower stay portion 42a. Due to such constitution, it is possible to prevent the various lines from being viewed from the outside of the vehicle, thus enhancing the appearance of a motorcycle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A rear fender of a motorcycle, comprising:
    a left fender portion and a right fender portion, said left fender portion and right fender portion being dividable, and
    a line for an electric component,
    wherein said rear fender is fixable in an inside of a rear portion of a seat rail of the motorcycle,
    wherein said rear fender includes a base portion and at least one stay portion which extends in a rearward and downward direction from said base portion, and
    wherein a hollow portion is formed in said at least one stay portion and is defined by said left fender portion and said right fender portion, said line for said electrical component being encased in said hollow portion.

2. The rear fender of a motorcycle according to claim 1, wherein said electric component is at least one of rear turn signals and a license plate light disposed behind said a least one stay portion.

3. The rear fender of a motorcycle according to claim 1, further comprising:
    a turn signal mounting portion having two ends, disposed on an end portion of said at least one stay portion, and
    load hanging hooks mounted on said two ends of said turn signal mounting portion, said load hooks projecting in the downward direction,
    wherein rear turn signals are mounted on said two ends of said turn signal mounting portion, and
    wherein a license plate light is disposed above said turn signal mounting portion.

4. The rear fender of a motorcycle according to claim 2, further comprising:
    a turn signal mounting portion having two ends, disposed on an end portion of said at least one stay portion, and
    load hanging hooks mounted on said two ends of said turn signal mounting portion, said load hooks projecting in the downward direction,
    wherein said electric component includes both said rear turn signals and said license plate light,
    wherein said rear turn signals are mounted on said two ends of said turn signal mounting portion, and
    wherein said license plate light is disposed above said turn signal mounting portion.

* * * * *